US012779399B2

(12) United States Patent
Qiao et al.

(10) Patent No.: US 12,779,399 B2
(45) Date of Patent: Nov. 3, 2026

(54) CATALYSTS FOR GASOLINE ENGINE EXHAUST GAS TREATMENTS

(71) Applicant: Johnson Matthey (Shanghai) Chemicals Limited, Shanghai (CN)

(72) Inventors: Dongsheng Qiao, Shanghai (CN); Zhou Shang, Shanghai (CN)

(73) Assignee: Johnson Matthey (Shanghai) Chemicals Limited, Shanghai (CN)

( * ) Notice: Subject to any disclaimer, the term of this patent is extended or adjusted under 35 U.S.C. 154(b) by 552 days.

(21) Appl. No.: 18/465,187

(22) Filed: Sep. 12, 2023

(65) Prior Publication Data

US 2024/0109035 A1 Apr. 4, 2024

Related U.S. Application Data

(60) Provisional application No. 63/380,477, filed on Oct. 21, 2022.

(30) Foreign Application Priority Data

Sep. 30, 2022 (CN) ........................ 202211208300.X

(51) Int. Cl.

| | |
|---|---|
| ***B01D 53/94*** | (2006.01) |
| ***B01J 23/63*** | (2006.01) |
| ***F01N 3/08*** | (2006.01) |
| ***F01N 3/10*** | (2006.01) |

(52) U.S. Cl.

CPC ....... *B01D 53/945* (2013.01); *B01D 53/9477* (2013.01); *B01J 23/63* (2013.01); *F01N 3/0814* (2013.01); *F01N 3/101* (2013.01)

(58) Field of Classification Search

CPC .............. B01D 53/945; B01D 53/9477; B01D 2255/1021; B01D 2255/2068; B01D 2255/9022; B01D 2255/9032; B01D 2255/908; B01D 2258/014; B01J 23/002; B01J 23/63; B01J 23/894; B01J 35/19; B01J 35/57; B01J 37/0244; B01J 37/0248

See application file for complete search history.

(56) References Cited

U.S. PATENT DOCUMENTS

| | | | | |
|---|---|---|---|---|
| 5,597,771 | A | 1/1997 | Hu et al. | |
| 2008/0207438 | A1 | 8/2008 | Suzuki | |
| 2008/0318770 | A1 * | 12/2008 | Matsueda | B01J 23/63 502/302 |
| 2011/0217216 | A1 | 9/2011 | Liu | |

(Continued)

FOREIGN PATENT DOCUMENTS

| | | | |
|---|---|---|---|
| CN | 109 731 595 | A | 5/2019 |
| CN | 114433080 | A | 5/2022 |

(Continued)

*Primary Examiner* — Brian A Mccaig

(74) *Attorney, Agent, or Firm* — BakerHostetler

(57) ABSTRACT

A three-way catalyst article, and its use in an exhaust system for internal combustion engines, is disclosed. The catalyst article for treating exhaust gas comprising: a substrate comprising an inlet end and an outlet end with an axial length L; a first catalytic region comprising a first platinum group metal (PGM) component and a first Nd component, wherein the first PGM component comprises platinum, and wherein the weight ratio between Nd and Pt in the first catalytic region is at least 2:1.

20 Claims, 9 Drawing Sheets

(56) References Cited

U.S. PATENT DOCUMENTS

| | | | | |
|---|---|---|---|---|
| 2012/0122672 | A1* | 5/2012 | Matsueda | B01D 53/945 502/302 |
| 2015/0038325 | A1 | 2/2015 | Ando | |
| 2015/0352530 | A1 | 12/2015 | Nagao | |
| 2016/0318005 | A1 | 11/2016 | Nakahara | |
| 2020/0406234 | A1 | 12/2020 | Qi | |
| 2022/0134314 | A1 | 5/2022 | Howard | |

FOREIGN PATENT DOCUMENTS

| | | | |
|---|---|---|---|
| EP | 1042051 | B1 | 1/2008 |
| EP | 2412437 | A1 | 2/2012 |
| EP | 2039425 | B1 | 10/2014 |
| JP | 4432588 | B2 | 3/2010 |
| JP | 2012050980 | A | 3/2012 |
| JP | 5804624 | B2 | 11/2015 |
| WO | 2014034524 | A1 | 3/2014 |
| WO | 2015079739 | A1 | 6/2015 |

* cited by examiner

CATALYSTS FOR GASOLINE ENGINE EXHAUST GAS TREATMENTS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("NOR"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of NOR.

Despite advances in TWC technology, there remains a need for improved catalytic converters for certain engine platforms that simultaneously improve the performance in cold start stage, give better light off performance, as well as at hot transient stage, give better OSC performance, with wide range of Pd and/or Pt applications. Palladium (Pd) and rhodium (Rh) have been widely used in TWC formulations to reduce harmful emissions in gasoline vehicles. However, in recent years, these precious metal prices have climbed up to be even more precious, due to rising demand in the market. On the other hand, tighter and tighter environmental regulations worldwide have forced automobile industries to put even more precious metals into their catalytic converters. In the meantime, platinum (Pt) has become a more and more attractive candidate for gasoline applications due to its relatively cheaper price. Thus, Pd substitution by Pt in gasoline products draws broadly interests in market due to much lower price of Pt when compared with Pd. With simply replacement of Pd with Pt on current existing Pd—Rh TWC formulation, the inferior performance was always observed, due to the less thermal stability of Pt and the different chemical reactivity of Pt. To achieve comparable or even better performance against with Pd/Rh TWC after Pd substitution by Pt, numerous efforts have been taken to improve the performance of Pt containing TWC. This invention solves these problems amongst others.

SUMMARY OF THE INVENTION

One aspect of the present disclosure is directed to a catalytic article for treating exhaust gas comprising: a substrate comprising an inlet end and an outlet end with an axial length L, a first catalytic region comprising a first platinum group metal (PGM) component and a first Nd component, wherein the first PGM component comprises platinum, and wherein the weight ratio between Nd and Pt in the first catalytic region is at least 2:1.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

Figure 1:
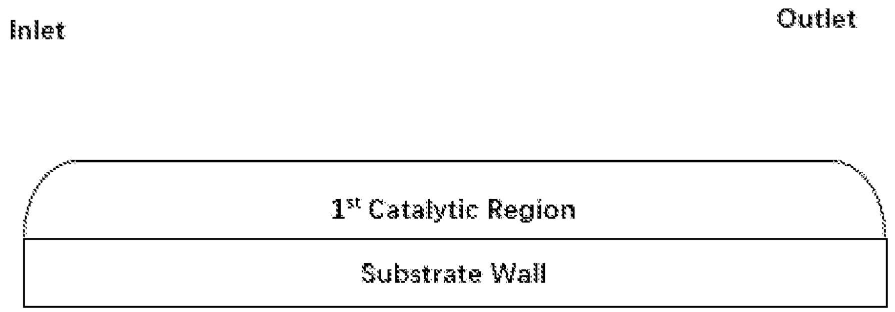
FIG. 1 shows one embodiment according to the present invention, which contains first catalytic region with a length of 100% to the axial length L of the substrate (single layer).
Figure 2A:
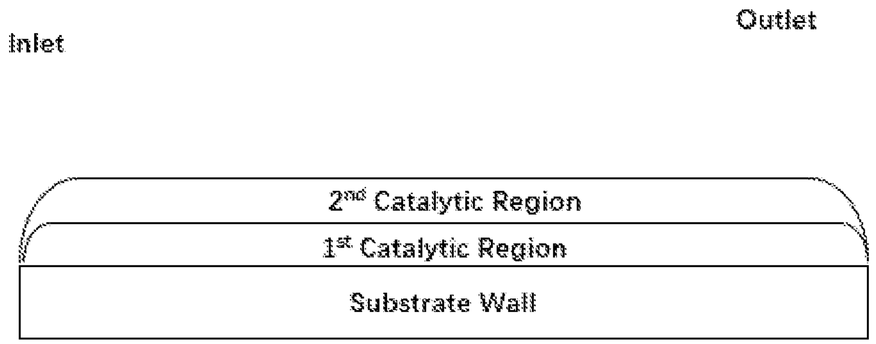
FIG. 2*a* shows one embodiment according to the present invention, the first catalytic region extends 100% of the axial length L, as bottom layer; the second catalytic region extends 100% of the axial length L, as top layer.
Figure 2B:
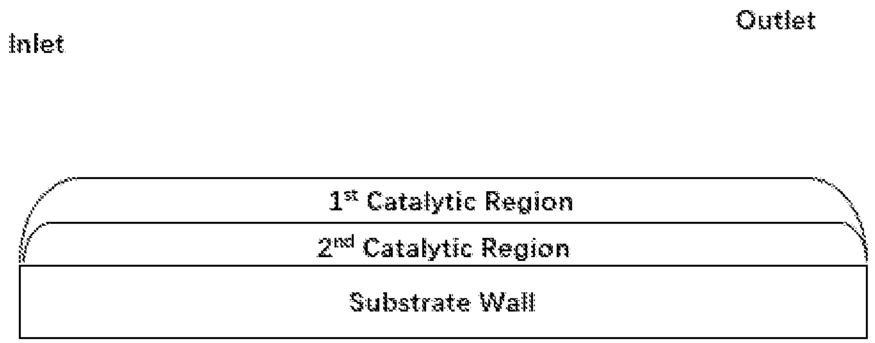
FIG. 2*b* depicts a variation of FIG. 2*a*.
Figure 3A:
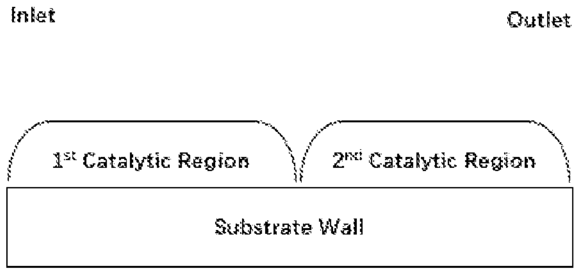
FIG. 3*a* shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 3B:
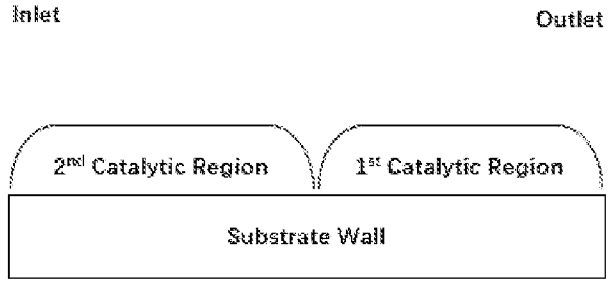
FIG. 3*b* depicts a variation of FIG. 3*a*.
Figure 3C:
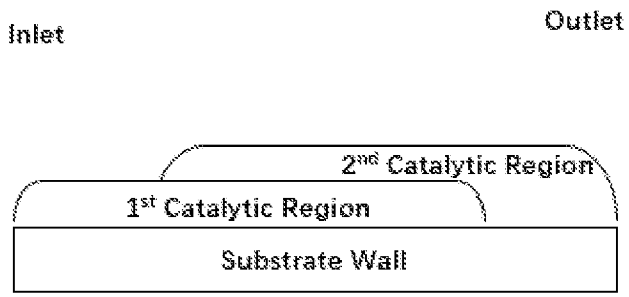
FIG. 3*c* shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figure 3D:
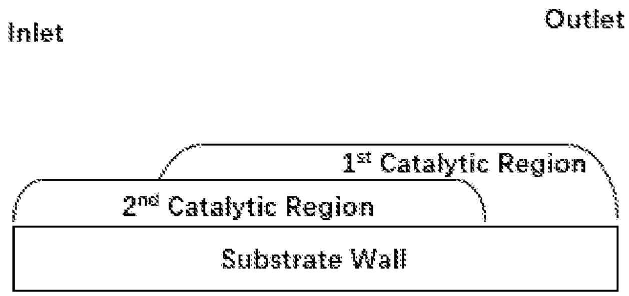
FIG. 3*d* depicts a variation of FIG. 3*c*.
Figure 4A:
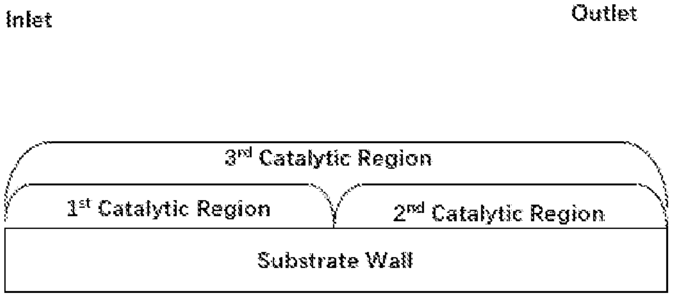
FIG. 4*a* shows one embodiment according to the present invention, the first catalytic region extends less than 100% of the axial length L, from the inlet end; the second catalytic region extends less than 100% of the axial length L, from the outlet end. The total length of the second and the first catalytic region is less than or equal to the axial length L. The 3rd catalytic region extends 100% of the axial length L and overlies the first and second catalytic regions as top layer.
Figure 4B:
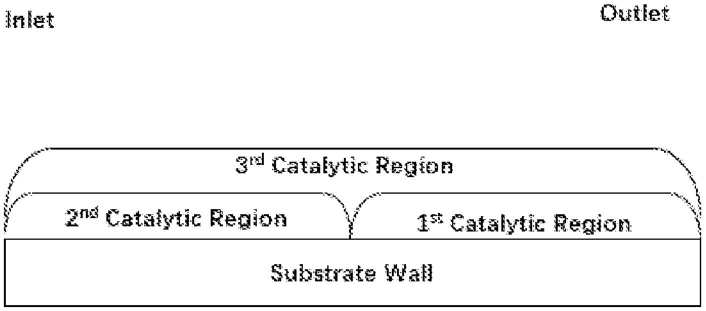
FIG. 4*b* depicts a variation of FIG. 4*a*.
Figure 4C:
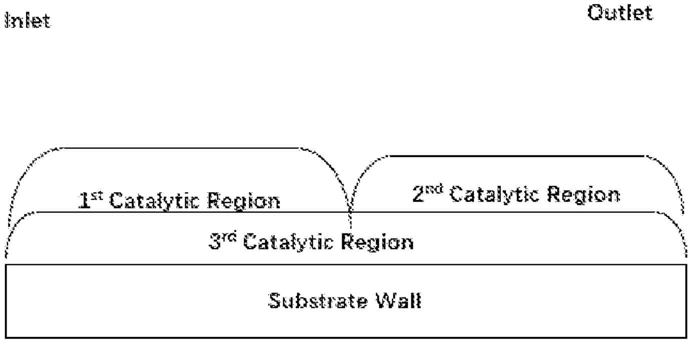
FIG. 4*c* shows one embodiment according to the present invention, the 3rd catalytic region extends 100% of the axial length L as bottom layer. The first catalytic region extends less than 100% of the axial length L, from the inlet end; the second catalytic region extends less than 100% of the axial length L, from the outlet end. The total length of the second and the first catalytic region is less than or equal to the axial length L.
Figure 4D:
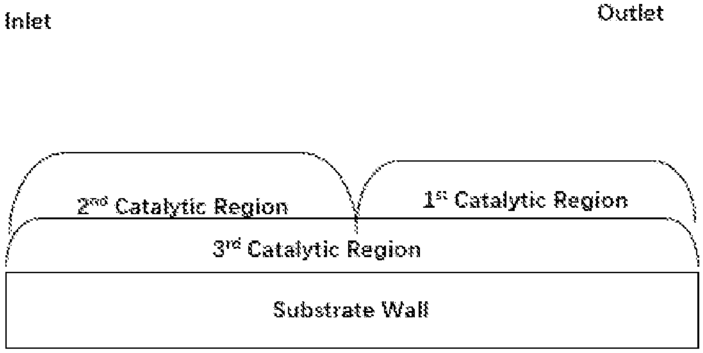
FIG. 4*d* depicts a variation of FIG. 4*c*.
Figure 5A:
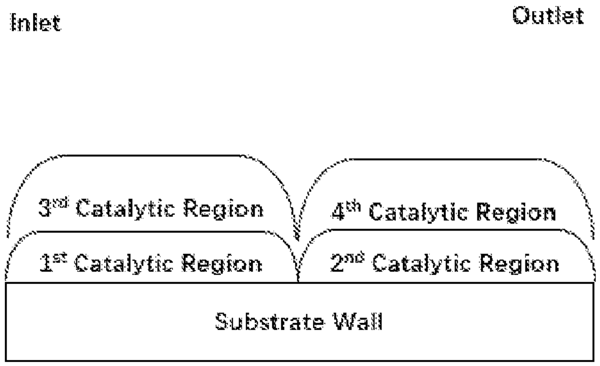
FIG. 5*a* shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The third catalytic region extends less than 100% of the axial length L, from the inlet end; the fourth catalytic region extends less than 100% of the axial length L, from the outlet end. The total length of the third and the fourth catalytic region can be less than, equal to, or greater than the axial length L. The first and second catalytic regions constitutes bottom layer; and the third and fourth catalytic regions constitutes top layer.
Figure 5B:
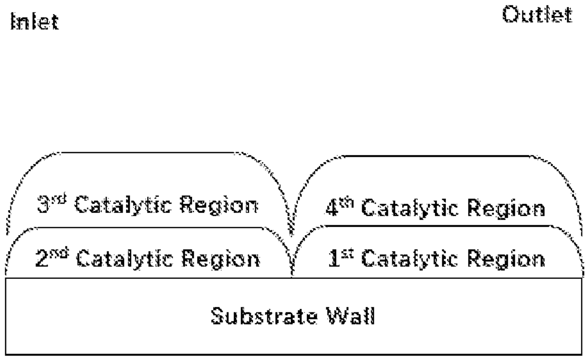
FIGS. 5*b*, 5*c*, and 5*d* depict variations of FIG. 5*a*.
Figure 5C:
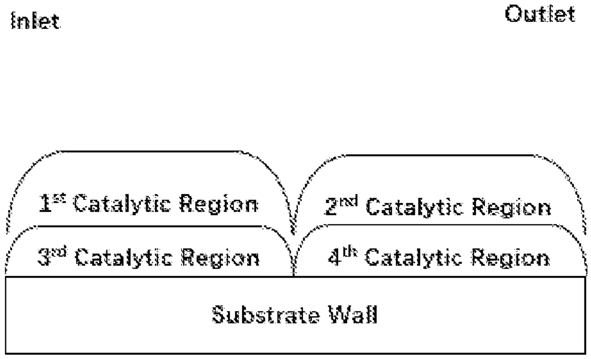
Figure 5D:
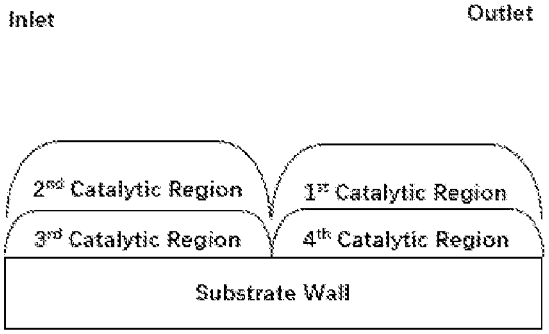
Figure 6A:
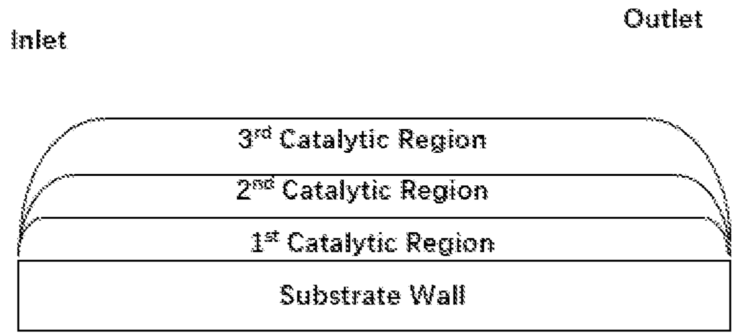
FIG. 6*a* shows one embodiment according to the present invention, the first catalytic region extends 100% of the axial length L, as bottom layer; the second catalytic region extends 100% of the axial length L, as middle layer; and the third catalytic region extends 100% of the axial length L, as top layer.
Figure 6B:
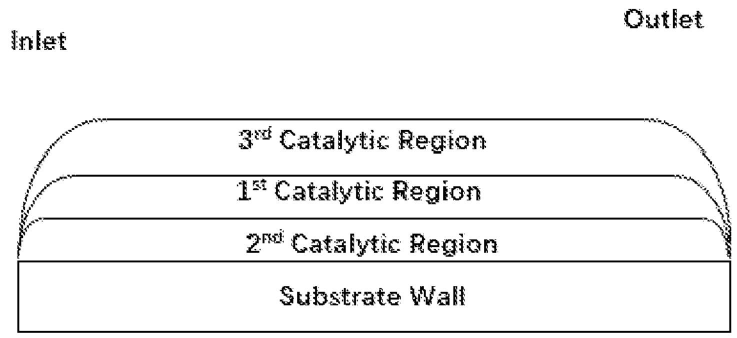
FIGS. 6*b* and 6*c* depict variations of FIG. 6*a*.
Figure 6C:
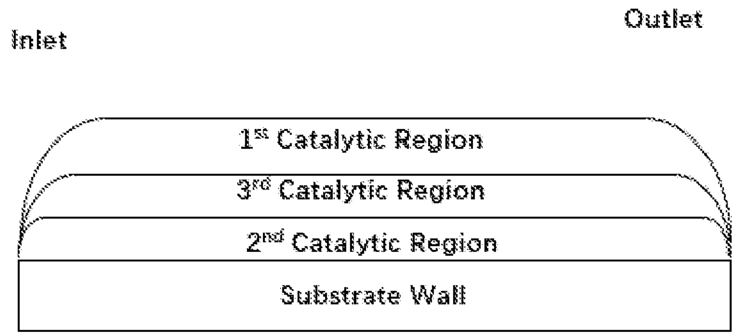
Figure 7A:
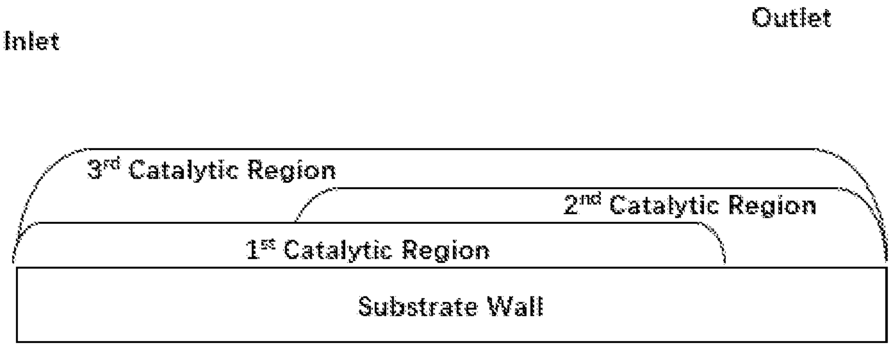
FIG. 7*a* shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L. The 3rd catalytic region extends 100% of the axial length L and overlies the first and second catalytic regions as top layer.
Figure 7B:
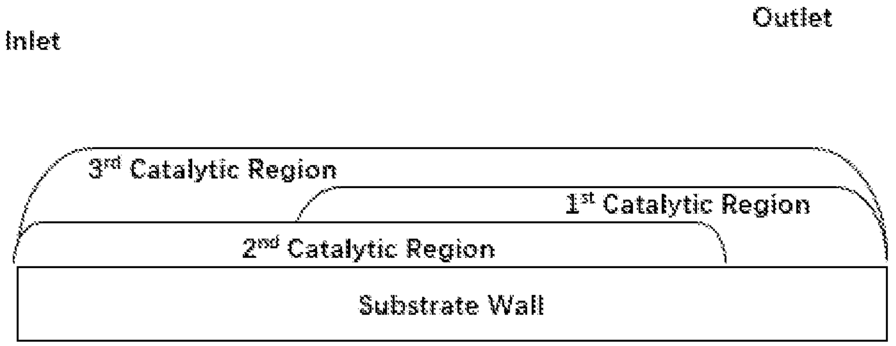
Figure 7C:
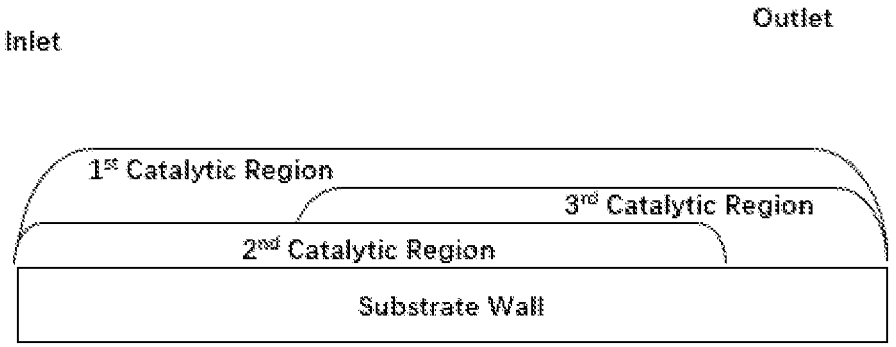
Figure 7D:
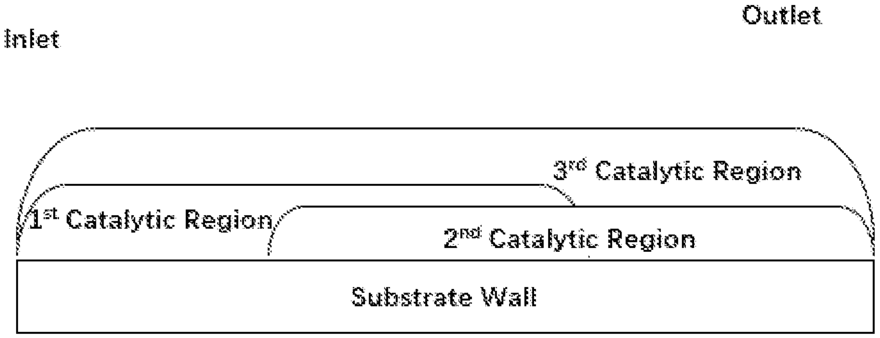
Figure 7E:
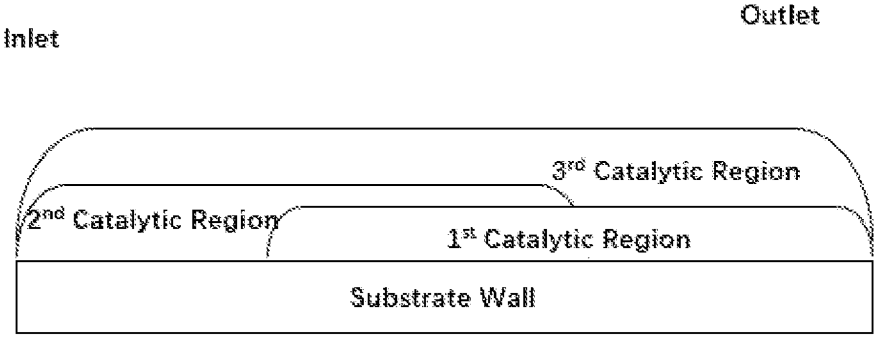
Figure 7F:
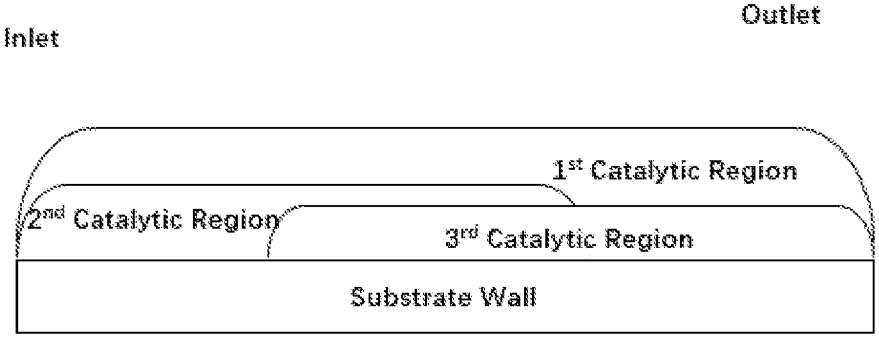

FIGS. 7*b*-7*f* depict variations of FIG. 7*a*.

Figure 7G:
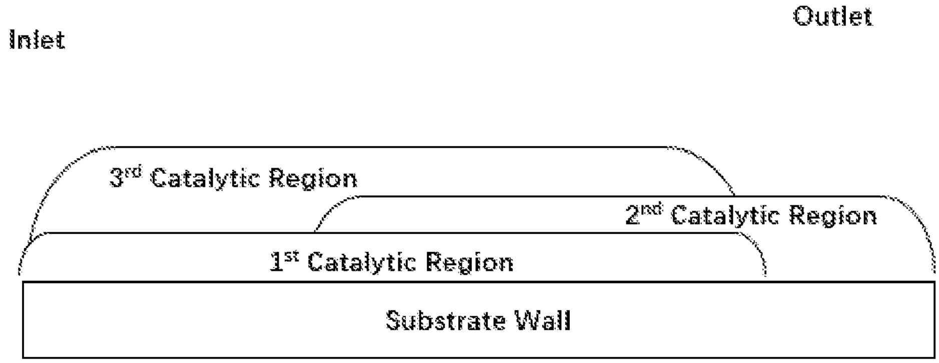

FIG. 7*g* shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The 3rd catalytic region extends less than 100% of the axial length L from the inlet end and at least partially overlies the first and/or second catalytic regions.

Figure 7H:
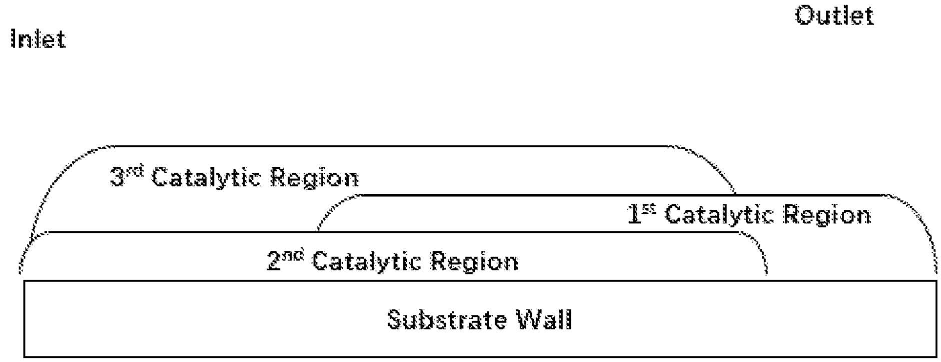
Figure 7I:
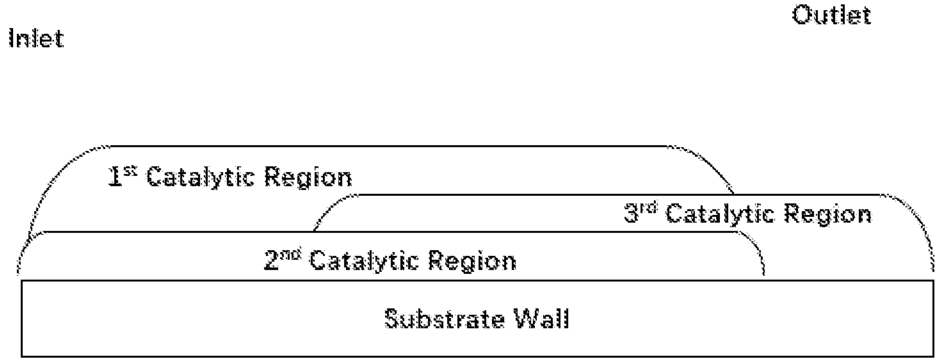

FIGS. 7*h* and 7*i* depict variations of FIG. 7*g*.

Figure 7J:
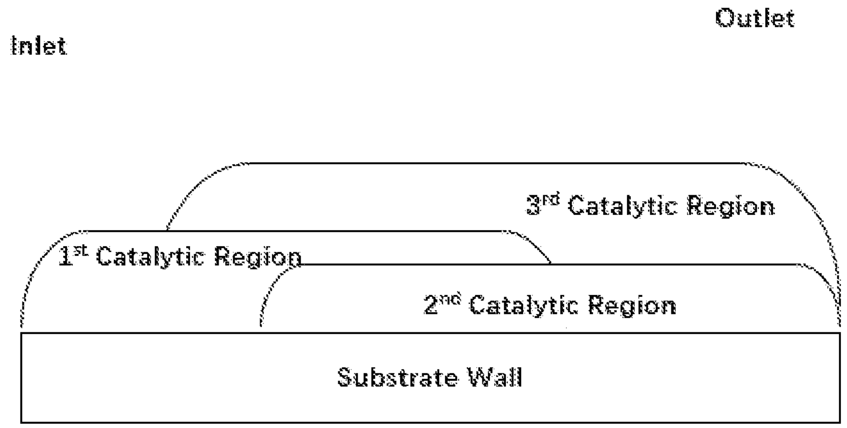

FIG. 7*j* shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The 3rd catalytic region extends less than 100% of the axial length L from the outlet end and at least partially overlies the second and/or first catalytic regions.

Figure 7K:
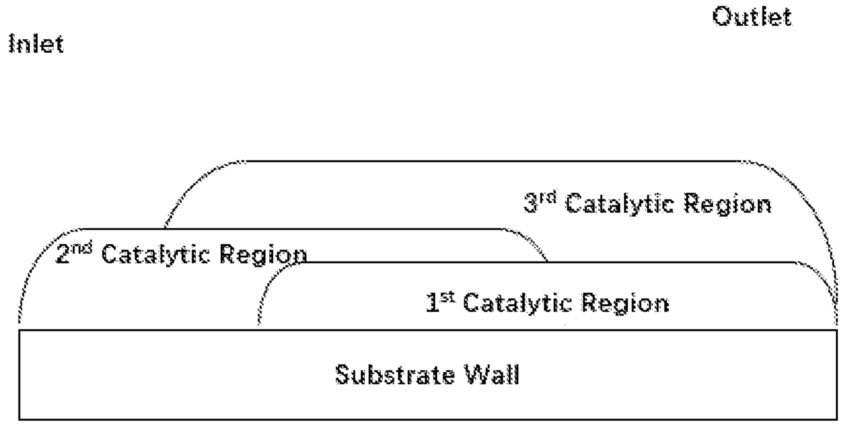
Figure 7L:
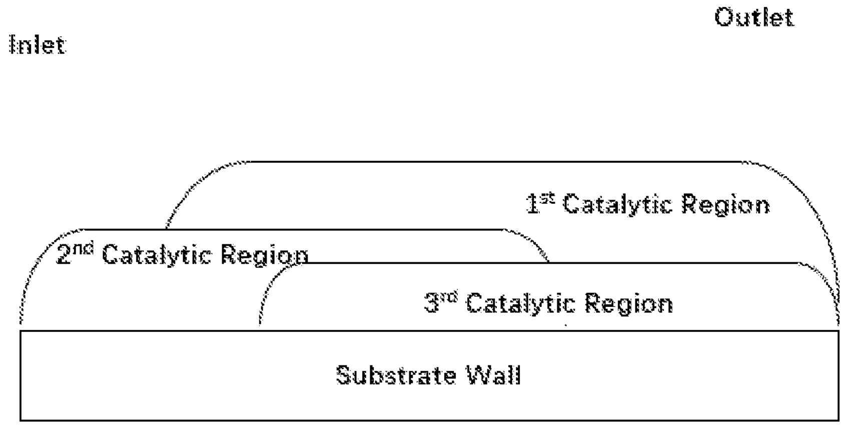

FIGS. 7*k* and 7*l* depict variations of FIG. 7*j*.

DETAILED DESCRIPTION OF THE INVENTION

The present invention is directed to the catalytic treatment of combustion exhaust gas, such as that produced by gasoline and other engines, and to related catalysts compositions, catalytic articles, and systems. More specifically, the invention relates the simultaneous treatment of NOR, CO, and HC in a vehicular exhaust system by using Pt containing TWC under a novel design as described in this invention. The inventors have discovered an effective approach to improve the performance of Pt containing TWC even after the harsh aging conditions, which enables more applications of the lower cost of Pt containing TWC in the real field to replace the high cost of typical Pd/Rh TWC. The inventors have also discovered that TWC performance of Pt/Rh TWC or Pt/Pd/Rh TWC under vehicle emission testing were improved with this invention.

One aspect of the present disclosure is directed to a catalytic article for treating exhaust gas comprising: a substrate comprising an inlet end and an outlet end with an axial length L, a first catalytic region comprising a first platinum group metal (PGM) component and a first Nd component, wherein the first PGM component comprises platinum, and wherein the weight ratio between Nd and Pt in the first catalytic region is at least 2:1.

Through intensive research, the inventors have found that by incorporating Nd component into the Pt containing TWC catalyst compositions and discovered a proper weight ratio of Nd to Pt in the first catalytic region, these novel designs in Pt containing TWC have demonstrated improved catalytic properties (e.g., all the emissions, THC/NMHC, CO and $NO_x$ emission could get significant reduced during vehicle testing by using this novel Pt containing catalyst design as described in this invention).

First Catalytic Region

The weight ratio between Nd and Pt is based on metal element. In some embodiments, the weight ratio between Nd and Pt in the first catalytic region can be at least 2:1, 5:2, 3:1, or even 4:1. Alternatively, the weight ratio between Nd and Pt in the first catalytic region can be 20:1 to 2:1, 15:1 to 2:1, 10:1 to 2:1, 8:1 to 2:1, 6:1 to 2:1, 5:1 to 2:1, or 4:1 to 2:1. In other embodiments, the weight ratio between Nd and Pt in the first catalytic region can be 20:1 to 5:2, 15:1 to 5:2, 10:1 to 5:2, 8:1 to 5:2, 6:1 to 5:2, 5:1 to 5:2, or 4:1 to 5:2.

In some embodiments, the first PGM component can further comprise palladium, rhodium, or a combination thereof. In other embodiments, the first catalytic region is essentially free of other PGM components other than the platinum.

The first catalytic region can further comprise a first oxygen storage capacity (OSC) material and/or a first inorganic oxide.

The first OSC material can be cerium oxide, zirconium oxide, a ceria-zirconia mixed oxide, an alumina-ceria-zirconia mixed oxide, or a combination thereof. More preferably, the first OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. The first OSC material may function as a support material for the first PGM component (e.g., as the first PGM support material). In some embodiments, the first OSC material comprises the ceria-zirconia mixed oxide and the alumina-ceria-zirconia mixed oxide.

The first inorganic oxide is preferably an oxide of Groups 2, 3, 4, 5, 13 and 14 elements. The first inorganic oxide is preferably selected from the group consisting of alumina, magnesia, silica, zirconia, barium oxides, and mixed oxides or composite oxides thereof. Particularly preferably, the first inorganic oxide is alumina, lanthanum-alumina, zirconia, or a magnesia/alumina composite oxide. One especially preferred first inorganic oxide is alumina or lanthanum-alumina.

The first OSC material and the first inorganic oxide can have a weight ratio of no greater than 10:1; preferably, no greater than 8:1 or 5:1; more preferably, no greater than 4:1 or 3:1; most preferably, no greater than 2:1.

Alternatively, the first OSC material and the first inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the first OSC material and the first inorganic oxide can have a weight ratio of no less than 2:1. In further embodiments, the first OSC material and the first inorganic oxide can have a weight ratio of no less than 10:1. In another further embodiments, the first OSC material and the first inorganic oxide can have a weight ratio of no less than 20:1 or no less than 30:1. In yet another further embodiments, the first OSC material and the first inorganic oxide can have a weight ratio of no less than 40:1 or no less than 50:1.

The first catalytic region may further comprise a first alkali or alkaline earth metal.

The first alkali or alkaline earth metal is preferably barium or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the first catalytic region.

Preferably the barium or the strontium is present as $BaCO_3$ or $SrCO_3$. Such a material can be performed by any method known in the art, for example incipient wetness impregnation or spray-drying.

Neodymium (Nd) can be incorporated into the first catalytic region in various ways. In some embodiments, Nd can be incorporated into the first OSC material as dopant. In other embodiments, Nd can be incorporated into the first inorganic oxide as dopant. In yet other embodiments, Nd can be incorporated into the first catalytic region as simple physical mixture (e.g., physical blend). For example, Nd can be incorporated as $Nd_2O_3$ or Nd nitrate to be physically blended with the first OSC material and/or the first inorganic oxide. In other embodiments, Nd can be incorporated into the first OSC material framework (e.g., Nd doped into the crystal lattice of the OSC solid solution material as formed). In certain embodiments, Nd can be incorporated into the first catalytic region in any combinations of the embodiments as described above, for example, in some embodiments, at least some of the first Nd component can be supported on the first inorganic oxide.

In some embodiments, the first catalytic region can comprise at least 2 wt. %, at least 3 wt. %, or at least 3.5 wt. % of the first Nd component (based on $Nd_2O_3$). Alternatively, the first catalytic region can comprise 2 to 15 wt. % of the first Nd component (based on $Nd_2O_3$); 2 to 10 wt. %, 2 to 8 wt. %, or 2 to 6 wt. % of the first Nd component; 3 to 10 wt. %, 3 to 8 wt. %, or 3 to 6 wt. % of the first Nd component; or 3.5 to 10 wt. %, 3.5 to 8 wt. %, or 3.5 to 6 wt. % of the first Nd component, based on the total weight of the first catalytic region.

In certain embodiments, the first catalytic region can further comprise a transition metal component, wherein the transition metal is Fe, Ni, Cu, or a combination thereof. Preferably, the transition metal can be Fe and/or Ni.

In some embodiments, the first catalytic region can have a Pt loading of 1-100 g/ft$^3$, 5-90 g/ft$^3$, 10 to 80 g/ft$^3$, 15 to 70 g/ft$^3$, 20 to 60 g/ft$^3$, or 20 to 50 g/ft$^3$.

As demonstrated in the Examples below, the catalyst article in this aspect can be applied as a TWC catalyst for treating exhaust gas produced by gasoline engines.

The first catalytic region can extend for 100 percent of the axial length L. (E.g., see FIGS. 1, 2*a*, 2*b*, and 6*a*-6*c*). In some embodiments, the first catalytic region can extend for 20 to 99%, 30 to 90%, or 40-80% of the axial length L. Alternatively, the first catalytic region can extend for 30 to 70 percent of the axial length L. Preferably, for 40 to 60 percent, more preferably, 45 to 55 percent of the axial length L, (E.g., see FIGS. 3*a*-5*d* and 7*a*-7*l*).

The total washcoat loading of the first catalytic region can be less than 3.5 g/in$^3$; preferably, less than 3.0 g/in 3 or 2.5 g/in$^3$. Alternatively, the total washcoat loading of the first catalytic region can be from 0.5 to 3.5 g/in$^3$; preferably, can be from 0.6 to 3 g/in 3 or 0.7 to 2.5 g/in$^3$.

Second Catalytic Region

The catalytic article may further comprise a second catalytic region.

The second catalytic region can further comprise a second PGM component, a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Rh or a mixture thereof.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 70:30. Alternatively, the ceria-zirconia mixed oxide also can have a weight ratio of ceria to zirconia less than 50:50, preferably, less than 40:60, more preferably, less than 30:70.

The second OSC material (e.g., ceria-zirconia mixed oxide) can be from 10 to 90 wt. %; preferably, 25-75 wt. %; more preferably, 30-60 wt. %, based on the total washcoat loading of the second catalytic region.

The second OSC material loading in the second catalytic region can be less than 2 g/in$^3$. In some embodiments, the second OSC material loading in the second catalytic region is no greater than 1.5 g/in$^3$, 1.2 g/in$^3$, 1 g/in$^3$, 0.8 g/in 3, or 0.7 g/in$^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, zirconia, barium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1; preferably, no greater than 8:1 or 5:1; more preferably, no greater than 4:1 or 3:1; most preferably, no greater than 2:1.

Alternatively, the second OSC material and the second inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the second OSC material and the second inorganic oxide can have a weight ratio of no less than 2:1. In further embodiments, the second OSC material and the second inorganic oxide can have a weight ratio of no less than 10:1. In another further embodiments, the second OSC material and the second inorganic oxide can have a weight ratio of no less than 20:1 or no less than 30:1. In yet another further embodiments, the second OSC material and the second inorganic oxide can have a weight ratio of no less than 40:1 or no less than 50:1.

The total washcoat loading of the second catalytic region can be less than 3.5 g/in$^3$; preferably, less than 3.0 g/in 3 or 2.5 g/in$^3$. Alternatively, the total washcoat loading of the first catalytic region can be from 0.5 to 3.5 g/in$^3$; preferably, can be from 0.6 to 3 g/in 3 or 0.7 to 2.5 g/in$^3$.

The second catalytic region can extend for 100 percent of the axial length L. (E.g., see FIGS. 2_a_, 2_b_, and 6_a_-6_c_)

The second catalytic region can extend for 30 to 70 percent of the axial length L. Preferably, for 40 to 60 percent, more preferably, 45 to 55 percent of the axial length L. and most preferably, the total length of the second region and the first region is equal or greater than the axial length L (E.g., see FIGS. 3_a_-5_d_ and 7_a_-7_l_).

The second catalytic region can overlap with the first catalytic region for 0.1 to 99 percent of the axial length L (e.g., see FIGS. 3_c_ and 3_d_, the first catalytic region can overlie the second catalytic region or the second catalytic region can overlie the first catalytic region). Alternatively, the total length of the second catalytic region and the first catalytic region can equal to the axial length L (e.g., see FIGS. 3_a_ and 3_b_). In yet another alternative, total the length of the second catalytic region and the first catalytic region can be less than the axial length L, for example, no greater than 95%, 90%, 80%, or 70% of the axial length L.

In some embodiments, the first catalytic region can be supported/deposited directly on the substrate. In certain embodiments, the second catalytic region can be supported/deposited directly on the substrate.

Third Catalytic Region

The catalytic article may further comprise a third catalytic region.

The third catalytic region can further comprise a third PGM component, a third oxygen storage capacity (OSC) material, a third alkali or alkaline earth metal component, and/or a third inorganic oxide.

The third PGM component can be selected from the group consisting of platinum, palladium, rhodium, and a mixture thereof. In some embodiments, the third PGM component can be Pd, Rh or a mixture thereof.

The third OSC material can be cerium oxide, zirconium oxide, a ceria-zirconia mixed oxide, an alumina-ceria-zirconia mixed oxide, or a combination thereof. More preferably, the third OSC material comprises the ceria-zirconia mixed oxide, the alumina-ceria-zirconia mixed oxide, or a combination thereof. In addition, the third OSC material may further comprise one or more of dopants like lanthanum, neodymium, praseodymium, yttrium etc. Moreover, the third OSC material may have the function as a support material for the third PGM component. In some embodiments, the third OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 75:25. Alternatively, the ceria-zirconia mixed oxide also can have a weight ratio of ceria to zirconia less than 50:50; preferably, less than 40:60; more preferably, less than 25:75.

The third OSC material (e.g., ceria-zirconia mixed oxide) can be from 10 to 90 wt. %; preferably, 25-75 wt. %; more preferably, 30-60 wt. %, based on the total washcoat loading of the third catalytic region.

The third OSC material loading in the third catalytic region can be less than 1.5 g/in$^3$. In some embodiments, the third OSC material loading in the second catalytic region is no greater than 1.2 g/in$^3$, 1.0 g/in$^3$, 0.9 g/in$^3$, 0.8 g/in 3, or 0.7 g/in$^3$.

The total washcoat loading of the third catalytic region can be less than 3.5 g/in$^3$; preferably, no more than 3.0 g/in$^3$, 2.5 g/in$^3$, or 2 g/in$^3$.

The third alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the third catalytic region.

It is even more preferable that the third alkali or alkaline earth metal is strontium. The strontium, where present, is preferably present in an amount of 0.1 to 15 wt. %, and more preferably 3 to 10 wt. %, based on the total weight of the third catalytic region.

It is also preferable that the third alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the third catalytic region. It is more preferable that the third alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The third inorganic oxide is preferably an oxide of Groups 2, 3, 4, 5, 13 and 14 elements. The third inorganic oxide is preferably selected from the group consisting of alumina, magnesia, silica, zirconia, barium oxides, and mixed oxides or composite oxides thereof. Particularly preferably, the third inorganic oxide is alumina, lanthanum-alumina, zirconia, or a magnesia/alumina composite oxide. One especially preferred third inorganic oxide is alumina or lanthanum-alumina.

The third OSC material and the third inorganic oxide can have a weight ratio of no greater than 10:1; preferably, no greater than 8:1 or 5:1; more preferably, no greater than 4:1 or 3:1; most preferably, no greater than 2:1.

Alternatively, the third OSC material and the third inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the third OSC material and the third inorganic oxide can have a weight ratio of no less than 2:1. In further embodiments, the third OSC material and the third inorganic oxide can have a weight ratio of no less than 10:1. In another further embodiments, the third OSC material and the third inorganic oxide can have a weight ratio of no less than 20:1 or no less than 30:1. In yet another further embodiments, the third OSC material and the third inorganic oxide can have a weight ratio of no less than 40:1 or no less than 50:1.

The third catalytic region can extend for 100 percent of the axial length L (e.g., see FIGS. 4_a_-4_d_ and 6_a_-6_c_).

The third catalytic region can be less than the axial length L, for example, no greater than 95%, 90%, 80%, or 70% of the axial length L (e.g., see FIGS. 5_a_-5_d_ and 7_g_-71).

The second catalytic region can overlap with the first catalytic region for 0.1 to 99 percent of the axial length L (e.g., see FIGS. 7*a*-71), the first catalytic region can overlie the second catalytic region, or the second catalytic region can overlie the first catalytic region). Alternatively, the either of second or first region can extend for 30 to 70 percent of the axial length L. Preferably, for 40 to 60 percent, more preferably, 45 to 55 percent of the axial length L. and most preferably, the total length of the second and the first region is equal or less than the axial length L (e.g., see FIGS. 4*a*-4*d*).

Fourth Catalytic Region

The catalytic article may further comprise a fourth catalytic region.

The fourth catalytic region can further comprise a fourth PGM component, a fourth oxygen storage capacity (OSC) material, a fourth alkali or alkaline earth metal component, and/or a fourth inorganic oxide.

The fourth PGM component can be selected from the group consisting of platinum, palladium, rhodium, and a mixture thereof. In some embodiments, the fourth PGM component can be Pd, Rh or a mixture thereof.

The fourth catalytic region may have the same or similar composition as the third catalytic region.

The fourth catalytic region can be less than the axial length L, for example, no greater than 95%, 90%, 80%, or 70% of the axial length L.

Alternatively, either of fourth or the third catalytic region can extend for 30 to 70 percent of the axial length L. Preferably, for 40 to 60 percent, more preferably, 45 to 55 percent of the axial length L. and most preferably, the total length of the fourth and the third catalytic region is equal or greater than the axial length L (e.g., see FIGS. 5*a*-5*d*).

The catalyst article of the invention may comprise further components that are known to the skilled person. For example, the compositions of the invention may further comprise at least one binder and/or at least one surfactant. Where a binder is present, dispersible alumina binders are preferred.

Substrate

Preferably the substrate is a flow-through monolith. Alternatively, the substrate can be a wall-flow filter.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Another aspect of the present disclosure is directed to a method for treating a vehicular exhaust gas containing NOR, CO, and HC using the catalyst article described herein. Catalytic converters equipped with the Pt containing TWCs made according to this method show improved catalytic properties compared to conventional TWC (with the same PGM loading), also show obviously lower emissions on NOR, CO, and HC from gasoline vehicles tested over the bench aged TWCs. (e.g., see Examples 1-5; and Tables 1-6).

Another aspect of the present disclosure is directed to a system for treating vehicular exhaust gas comprising the catalyst article described herein in conjunction with a conduit for transferring the exhaust gas through the system.

Defintions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel. Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel. Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Example 1: Vehicle Testing Procedures and Results

Comparative Catalyst A

First Catalytic Region

The first catalytic region consists of Pt supported on a washcoat of a first OSC mixed oxide (containing 5 wt. % $Nd_2O_3$) and La-stabilized alumina. The washcoat loading of the first catalytic region was about 2.2 $g/in^3$ with a Pt loading of 49 $g/ft^3$. The weight ratio between Nd and Pt in the first catalytic region was 1.7:1 and the first catalytic region contained about 2.5 wt. % $Nd_2O_3$.

The first washcoat was then coated from both end face of a ceramic substrate (600 cpsi, 4.3 mil wall thickness) using standard coating procedures with coating depth targeted of 100% of the substrate length, dried at 100°C

Second Catalytic Region

The second catalytic region consists of Rh supported on a washcoat of a second CeZr mixed oxide and La-stabilized alumina. The washcoat loading of the second catalytic region was about 1.3 g/in$^3$ with a Rh loading of 6 g/ft$^3$.

The second washcoat was then coated from the outlet face of the ceramic substrate containing the first catalytic region from above, using standard coating procedures with coating depth targeted of 100% of the substrate length, dried at 100°C and calcined at 500° C. for 45 mins.

Catalyst B

Catalyst B was prepared according to the similar procedure as Comparative Catalyst A with the exception that the additional Nd nitrate was added through the physical mixing into the washcoat of the first catalytic region with the Nd content of 80 g/ft$^3$. The weight ratio between Nd and Pt in the first catalytic region was 3.3:1 and the first catalytic region contained about 4.8 wt. % $Nd_2O_3$.

The bench aged samples of Catalyst B and Comparative Catalyst A were tested over vehicle A of 1.5-liter engine with Worldwide Light Duty Testing Procedure (WLTP). The bench aging under 6.1-L engine in the same run for 200 hrs with four mode aging cycle, with peak bed temperature at about 980 °C in the catalysts. Results of vehicle exhaust diluted bag data over the bench aged parts are shown in Table 1. Catalyst B of the present invention presents excellent activity on THC, CO and $NO_x$ emission control, compared with Comparative Catalyst A (e.g., see the THC, CO and $NO_x$ performances improved with around 17%, 23% and 20%, respectively).

TABLE 1

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst A | 61.0 | 46.5 | 78.9 | 55.1 |
| Catalyst B | 50.9 | 38.6 | 60.6 | 44.3 |

Example 2: Vehicle Testing Procedures and Results

The comparative catalyst is the same as Comparative Catalyst A used in Example 1.

Catalyst C

Catalyst C was prepared according to the similar procedure as Comparative Catalyst A with the exception that in the first catalytic region, the additional Nd nitrate was added into the washcoat with the Nd content of 40 g/ft$^3$. The weight ratio between Nd and Pt in the first catalytic region was 2.5:1 and the first catalytic region contained about 3.7 wt. % $Nd_2O_3$.

Catalyst D

Catalyst D was prepared according to the similar procedure as Comparative Catalyst A with the exception that in the first catalytic region, the additional Nd nitrate was added into the washcoat with the Nd content of 120 g/ft$^3$. The weight ratio between Nd and Pt in the first catalytic region was 4.1:1 and the first catalytic region contained about 6 wt. % $Nd_2O_3$.

The bench aged samples of Catalyst C, Catalyst D, and Comparative Catalyst A were tested over vehicle B of 1.5-liter engine with Worldwide Light Duty Testing Procedure (WLTP). Vehicle B has different calibration than vehicle A. The bench aging was under 6.1-L engine in the same run for 200 hrs with four mode aging cycle, with peak bed temperature at about 980 °C in the catalysts. Results of vehicle exhaust diluted bag data over bench aged parts are shown in Table 2. Catalyst C of the present invention presents superior activities on THC and $NO_x$ emission control, compared with Comparative Catalyst A and Catalyst D, it shows that the performance on THC and $NO_x$ gets inferior, but comparable with Comparative Catalyst A, when further increase the content of Nd to 120 g/ft$^3$ as shown in Catalyst D.

TABLE 2

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst A | 46.3 | 36.0 | 47.6 | 39.9 |
| Catalyst C | 45.5 | 34.6 | 51.6 | 32.5 |
| Catalyst D | 48.7 | 37.7 | 46.8 | 40.4 |

Example 3: Vehicle Testing Procedures and Results

Comparative Catalyst E

First Catalytic Region

The first catalytic region consists of Pt and Pd supported on a washcoat of a first OSC (does not contain Nd) La-stabilized alumina, and Ba promoter. The washcoat loading of the first catalytic region was about 2.3 g/in$^3$ with a Pt loading of 22 g/ft$^3$ and a Pd loading of 24 g/ft$^3$. It does not contain Nd in the first catalytic region.

This washcoat was then coated from the inlet face of a ceramic substrate (600 cpsi, 2.5 mil wall thickness) using standard coating procedures with coating depth targeted of 100% of the substrate length, dried at 100 °C Second Catalytic Region The second catalytic region consists of Pt and Rh supported on a washcoat of a second CeZr mixed oxide and La-stabilized alumina. The washcoat loading of the second catalytic region was about 1.5 g/in$^3$ with a Pt loading of 3 g/ft$^3$ and a Rh loading of 6 g/ft$^3$.

The second washcoat was then coated from the outlet face of the ceramic substrate containing the first catalytic regions from above, using standard coating procedures with total coating depth targeted of 100% of the substrate length, dried at 100 °C and calcined at 500 °C for 45 mins.

Catalyst F

Catalyst F was prepared according to the similar procedure as Comparative Catalyst E with the exception that the additional Nd nitrate was added through the physical mixing into the washcoat of the first catalytic region with the Nd content of 80 g/ft$^3$. The weight ratio between Nd and Pt in the first catalytic region was 3.6:1 and the first catalytic region contained about 2.3 wt. % $Nd_2O_3$.

The bench aged samples of Catalyst F and Comparative Catalyst E were tested over vehicle A of 1.5-liter engine with Worldwide Light Duty Testing Procedure (WLTP). The bench aging is under 6.1-L engine in the same run for 200 hrs with four mode aging cycle, with peak bed temperature at about 980 °C in the catalysts. Results of vehicle exhaust diluted bag data over bench aged parts are shown in Table 3. Catalyst F of the present invention presented excellent activities on THC, CO and $NO_x$ emission control, compared with Comparative Catalyst E (e.g., see the THC, CO and $NO_x$ performances improved with around 10%, 16%, and 21% over Comparative Catalyst E, respectively).

TABLE 3

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst E | 44.3 | 32.5 | 41.8 | 40.5 |
| Catalyst F | 40.4 | 29.9 | 35.1 | 31.9 |

Example 4: Vehicle Testing Procedures and Results

Catalyst G

First Catalytic Region

The first catalytic region consists of Pt supported on a washcoat consisting of a first OSC mixed oxide (containing 5 wt. % $Nd_2O_3$), La-stabilized alumina. The washcoat loading of the first catalytic region was about 2.2 g/in$^3$ with a Pt loading of 36 g/ft$^3$. The weight ratio between Nd and Pt in the first catalytic region was 2.3:1 and the first catalytic region contained about 2.5 wt. % $Nd_2O_3$.

This washcoat was then coated from both end faces of a ceramic substrate (600 cpsi, 2.5 mil wall thickness) using standard coating procedures with coating depth targeted of 100% of the substrate length, dried at 100 °C and calcined at 500 °C for 45 mins.

Second Catalytic Region

The second catalytic region consists of Rh supported on a washcoat of a second CeZr mixed oxide and La-stabilized alumina. The washcoat loading of the second catalytic region was about 1.5 g/in$^3$ with a Rh loading of 4 g/ft$^3$.

The second washcoat was then coated from both end faces of the ceramic substrate containing the first catalytic regions from above, using standard coating procedures with total coating depth targeted of 100% of the substrate length, dried at 100 °C and calcined at 500 °C for 45 mins.

Catalyst H

Catalyst H was prepared according to the similar procedure as Catalyst G with the exception that in the first catalytic region, a different OSC mixed oxide (containing 6.5 wt. % $Nd_2O_3$) was used in the first catalytic region. The weight ratio between Nd and Pt in the first catalytic region was 3:1 and the first catalytic region contained about 3.3 wt. % $Nd_2O_3$.

Catalyst I

Catalyst I was prepared according to the similar procedure as Catalyst G with the exception that in the first catalytic region, a different OSC mixed oxide (containing 10 wt. % $Nd_2O_3$) was used in the first catalytic region. The weight ratio between Nd and Pt in the first catalytic region was 4.5:1 and the first catalytic region contained about 5 wt. % $Nd_2O_3$.

The bench aged samples of Catalysts G, H, and I were tested over vehicle A of 1.5-liter engine with Worldwide Light Duty Testing Procedure (WLTP). The bench aging under 6.1-L engine in the same run for 150 hrs with four mode aging cycle, with peak bed temperature at about 980 °C in the catalysts. Results of vehicle exhaust diluted bag data over the bench aged parts are shown in Table 4. While Catalyst H presents excellent activity on THC, CO, and $NO_x$ emission control, Catalysts G and I also demonstrated comparable performances. The results show that the performance of Pt/Rh TWC gets improved when introducing additional 1.5 wt. % $Nd_2O_3$ on the surface of the first OSC3 material, while it is comparable to the performance of Pt-TWC, when further increase loading of $Nd_2O_3$ to 5 wt. % on the surface of the first OSC4 material used in Catalyst I.

TABLE 4

Results of Emissions by Vehicle Diluted Bag Data

| | Exhaust Emissions (mg/km) | | | |
|---|---|---|---|---|
| | THC | NMHC | CO/10 | $NO_x$ |
| Catalyst G | 104.8 | 85.7 | 108.7 | 127.3 |
| Catalyst H | 80.5 | 63.9 | 82.7 | 106.9 |
| Catalyst I | 100.9 | 81.4 | 107.4 | 135.1 |

Example 5: Vehicle Testing Procedures and Results

Comparative Catalyst J

First Catalytic Region

The first catalytic region consists of Pt and Pd supported on a washcoat of a first OSC mixed oxide (no Nd), La-stabilized alumina, Ni promoter and Ba promoter. The washcoat loading of the first catalytic region was about 2.4 g/in$^3$ with a Pd loading of 43 g/ft$^3$ and a Pt loading of 41 g/ft$^3$. In the first catalytic region, it does not consist of Nd.

This washcoat was then coated from the inlet face of a ceramic substrate (600 cpsi, 2.5 mil wall thickness) using standard coating procedures with coating depth targeted of 100% of the substrate length, dried at 100 °C and calcined at 500 °C for 45 mins.

Second Catalytic Region

The second catalytic region consists of Pt and Rh supported on a washcoat of a second CeZr mixed oxide and La-stabilized alumina. The washcoat loading of the second catalytic region was about 1.5 g/in$^3$ with a Pt loading of 2 g/ft$^3$ and a Rh loading of 4 g/ft$^3$.

The second washcoat was then coated from the outlet face of the ceramic substrate containing the first catalytic regions from above, using standard coating procedures with total coating depth targeted of 100% of the substrate length, dried at 100 °C and calcined at 500 °C for 45 mins.

Catalyst K

Catalyst K was prepared according to the similar procedure as Comparative Catalyst J with the exception that in the first catalytic region, the additional Nd oxide and Fe nitrate were added into the first catalytic region through physical mixing with Nd content of 80 g/ft$^3$ and Fe content of 12 g/ft$^3$. The weight ratio between Nd and Pt in the first catalytic region was 2:1 and the first catalytic region contained about 2.2 wt. % $Nd_2O_3$.

The bench aged samples of Catalyst K and Comparative Catalyst J were tested over vehicle C of 1.5-liter engine with Worldwide Light Duty Testing Procedure (WLTP). The bench aging is under 6.1-L engine in the same run for 260 hrs with four mode aging cycle, with peak bed temperature at about 980 °C in the catalysts. During the vehicle testing, either of the Catalyst K or Comparative Catalyst J was placed at the closed couple position in the upstream of the aftertreatment tailpipe along with the same commercial Pt/Rh catalyst placed at underfloor position in the downstream of the tailpipe. Results of vehicle exhaust diluted bag data over bench aged parts are shown in Table 5. Catalyst K of the present invention presents excellent activity on THC, CO and $NO_x$ emission control, compared with Comparative Catalyst J (e.g., see the THC and $NO_x$ performances improved with around 13%, and 23%, respectively). Results of vehicle exhaust direct emission after the bench aged Catalyst K and Comparatively Catalyst J are shown in Table 6. Catalyst K of the present invention presents significant performance improvement on all the emissions compared with Comparative Catalyst J (e.g., see the THC, CO/10, and $NO_x$ performances improved with around 35%, 10% and 39%, respectively).

TABLE 5

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst J | 27.8 | 23.5 | 24.8 | 21.4 |
| Catalyst K | 24.3 | 20.5 | 23.3 | 16.5 |

TABLE 6

Results of Emissions by Vehicle Direct Emission after Close coupled Bricks

| | Exhaust Emissions (mg/km) | | |
|---|---|---|---|
| | THC | CO/10 | $NO_x$ |
| Comparative Catalyst J | 48.1 | 51.3 | 132.0 |
| Catalyst K | 31.1 | 41.3 | 80.2 |

We claim:

1. A catalytic article for treating exhaust gas comprising:
a substrate comprising an inlet end and an outlet end with an axial length L,
a first catalytic region comprising a first platinum group metal (PGM) component and a first Nd component,
wherein the first PGM component comprises platinum, and
wherein the weight ratio between Nd and Pt in the first catalytic region is from 4:1 to 2:1.

2. The catalytic article of claim 1, wherein the first catalytic region further comprises a first oxygen storage capacity (OSC) material and/or a first inorganic oxide.

3. The catalytic article of claim 2, wherein the first OSC material is selected from the group consisting of cerium oxide, a ceria-zirconia mixed oxide, and an alumina-ceria-zirconia mixed oxide.

4. The catalytic article of claim 2, wherein the first inorganic oxide is selected from the group consisting of alumina, magnesia, silica, zirconia, lanthanum, cerium, neodymium, praseodymium, yttrium oxides, and mixed oxides or composite oxides thereof.

5. The catalytic article of claim 2, wherein at least some of the first Nd component is supported on the first inorganic oxide.

6. The catalytic article of claim 1, wherein the weight ratio between Nd and Pt in the first catalytic region is from 4:1 to 5:2.

7. The catalytic article of claim 1, wherein the first catalytic region contains at least 2 wt. % of the first Nd component, based on $Nd_2O_3$.

8. The catalytic article of claim 1, wherein the first catalytic region further comprises a transition metal component.

9. The catalytic article of claim 1, wherein the first PGM component further comprises Pd, Rh, or a combination thereof.

10. The catalytic article of claim 1, further comprising a second catalytic region that is distinct from the first catalytic region.

11. The catalytic article of claim 10, wherein the second catalytic region comprises a second PGM component.

12. The catalytic article of claim 11, wherein the second PGM component is selected from the group consisting of platinum, palladium, rhodium, and a mixture thereof.

13. The catalytic article of claim 10, wherein the second catalytic region further comprises a second OSC material and/or a second inorganic oxide.

14. The catalytic article of claim 13, wherein the second OSC material is selected from the group consisting of cerium oxide, zirconium oxide, a ceria-zirconia mixed oxide, and an alumina-ceria-zirconia mixed oxide.

15. The catalytic article of claim 13, wherein the second inorganic oxide is selected from the group consisting of alumina, magnesia, silica, zirconia, lanthanum, cerium, neodymium, praseodymium, yttrium oxides, and mixed oxides or composite oxides thereof.

16. The catalytic article of claim 10, wherein the second catalytic region extends for the axial length L.

17. The catalytic article of claim 10, wherein the second catalytic region is supported/deposited directly on the substrate.

18. The catalytic article of claim 1, wherein the first catalytic region extends for the axial length L.

19. The catalytic article of claim 18, wherein the first catalytic region is supported/deposited directly on the substrate.

20. The catalytic article of claim 1, wherein the first catalytic region extends for less than the axial length L.

* * * * *